Sept. 29, 1953     A. N. NELSON     2,653,638
NUT OPENER
Filed Feb. 13, 1951
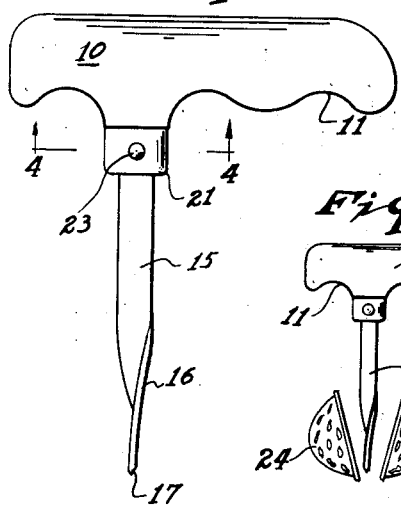
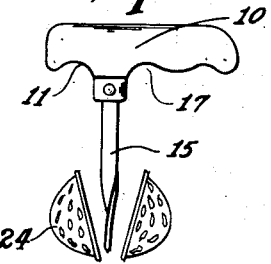
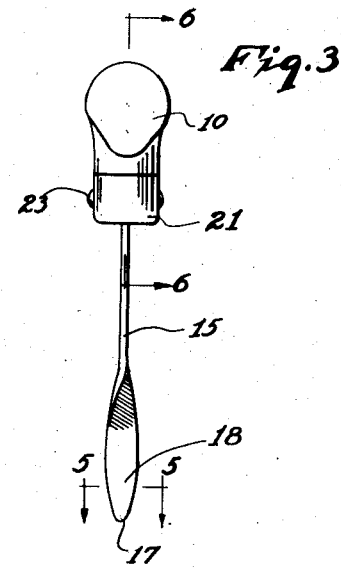
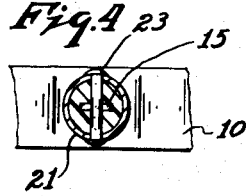
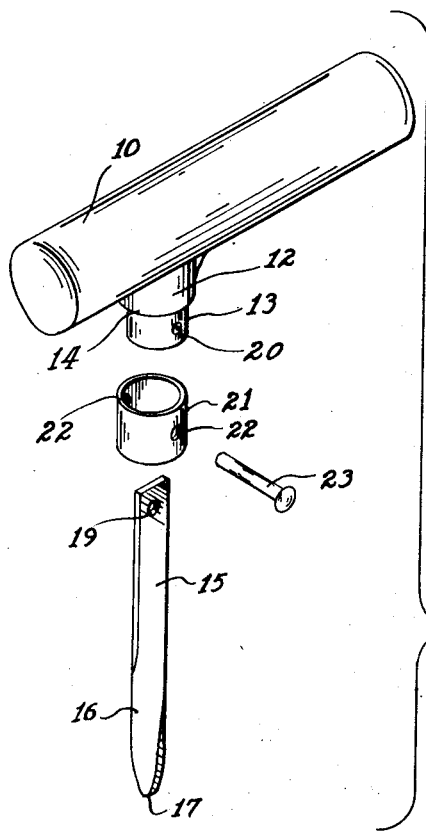
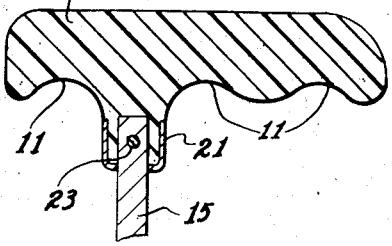
INVENTOR
ALFRED N. NELSON
BY
L. S. Saulsbury
ATTORNEY Patented Sept. 29, 1953

2,653,638

UNITED STATES PATENT OFFICE 2,653,638

NUT OPENER

Alfred N. Nelson, Flushing, N. Y.

Application February 13, 1951, Serial No. 210,693

1 Claim. (Cl. 146—13)

This invention relates to a device for opening nuts, particularly walnuts, whereby the nut may be effectively split into two parts without the necessity of breaking the nut open by means of a hammer or a nut cracker which usually results in the breaking of the shell of the nut into a number of pieces and the promiscuous scattering of such pieces in several directions thus making for an untidy and laborious operation.

The principal object of the invention is the production of a nut opener of the general character above described which shall contain few parts susceptible of ready assembly with facility and expedition and which shall be of simple construction and of ease to manufacture at a minimum of expense.

Other and further objects and advantages of the invention will appear as the description thereof proceeds, the invention consisting in the novel nut opener hereinafter more particularly described and then specified in the claims.

In the accompanying drawing illustrating a practical embodiment of the invention:

Fig. 1 is a side elevation of the improved nut opener of the invention.

Fig. 2 is a similar but smaller view showing the device as used in a nut-splitting operation.

Fig. 3 is an end elevation of the nut opener.

Fig. 4 is a fragmentary horizontal section on the line 4—4 of Fig. 1.

Fig. 5 is a horizontal section on the line 5—5 of Fig. 3.

Fig. 6 is a vertical cross-section on the line 6—6 of Fig. 3 and

Fig. 7 is an enlarged perspective and exploded view of the several parts of the device.

Referring in detail to the several figures of the drawing:

The handle of the nut opener is indicated at 10. It is generally of rounded formation, as best shown in Fig. 7, and preferably is constructed of a plastic material of any suitable character. Said handle is so molded or constructed as to provide depressions 11 at the lower portion thereof for receiving the fingers of the user to facilitate gripping of the handle. The handle is also provided with a depending stud or projection 12 integral therewith and terminating in a reduced annular portion 13 forming a shoulder 14 with the stud. It will be noted that said stud 12 is positioned nearer one end of the handle than the other end so as to provide a longer gripping portion for reception by the palm of the hand and a shorter gripping portion for receiving the forefinger of the user. This construction permits the user to grip the handle very firmly for the nut opening operation.

The shank of the blade of the opener is indicated at 15 and comprises a flat steel bar the lower end 16 of which is twisted so as to lie in a plane transverse to the plane of said shank. Said twisted portion 16 terminates in a sharpened cutting tip 17 for cutting and splitting the nut and said twisted portion including its tip is slightly concaved as indicated at 18 (Fig. 5) so as to facilitate the scooping out of the meat of the nut by said tip after the nut has been opened. An opening 19 is provided in the shank of the blade adjacent its upper end as best shown in Fig. 7.

The reduced portion 13 of the stud 12 is provided with a transverse opening 20 extending therethrough and with a groove therein of a size and depth adapting it to snugly receive the upper end of the shank 15 with its opening 19 registering with the opening 20 in said reduced portion. A ring or ferrule 21 also is provided and is of a size adapting it to snugly interfit with the reduced portion 13. Said ferrule has aligning openings 22 therein for registration with the openings 19 and 20 when the parts are assembled together.

To assemble and lock the parts of the opener together the ferrule 21 is slipped onto the reduced portion 13 and into engagement with the shoulder 14 and is rotated to a position whereby its openings 22 will register with the opening 20. The upper end of the shank of the blade 15 is then extended into the groove previously described in the reduced portion 13 of the stud 12. A headed pin indicated at 23 is provided and its shank is extended through the openings 22, 20 and 19 to hold the parts together. The free end of the shank of the pin 23 is thereupon riveted over the ferrule 21, as indicated in Fig. 4, to prevent said pin from being withdrawn from its locking position. It will be noted that when the parts are in assembled position, the twisted lower portion 16 of the blade lies generally in a plane at right angles to the longitudinal central axis of the handle 10.

To open a walnut, indicated at 24, the nut is held firmly on any suitable support and the sharpened cutting tip 17 is aligned with the soft end of the nut, and, in the case of a walnut, at the usual seam therein. Downward pressure is then applied by the handle 10 to split the nut cleanly into two parts and without breaking the shell into a multiplicity of bits or parts and permitting access to be had to the meat of the nut with ease and facility.

Various modifications may be made in the construction of the opener without departing from the invention as set forth in the appended claim.

The invention claimed is:

In a walnut opener, a handle and a flat elongated blade fixedly mounted in the handle with the axis of the blade being at right angles to the handle, said blade having a lower elongated end twisted substantially ninety degrees along the axis of the blade, said elongated twisted end being tapered and terminating in a sharp concaved tip, the twist of the blade being spaced from the tip of the blade a distance substantially less than the diameter of the walnut to be opened, whereby when the tip is thrust between the walnut sections and pressure applied against said handle the walnut sections will be severed, and upon the walnut sections being severed the concaved tip will serve to scoop out the meat contents of the walnut sections.

ALFRED N. NELSON.

References Cited in the file of this patent

UNITED STATES PATENTS

| Number | Name | Date |
|---|---|---|
| 113,212 | Sheble | Mar. 28, 1871 |
| 2,124,615 | Foltz | July 26, 1938 |
| 2,201,911 | Mizera | May 21, 1940 |
| 2,243,657 | Tachi | May 27, 1941 |
| 2,346,364 | Dowe | Apr. 11, 1944 |
| 2,461,524 | Cook | Feb. 15, 1949 |

FOREIGN PATENTS

| Number | Country | Date |
|---|---|---|
| 24,322 | Great Britain | of 1910 |
| 288,475 | Germany | Nov. 3, 1915 |
| 361,263 | Great Britain | Nov. 19, 1931 |